Patented June 24, 1941

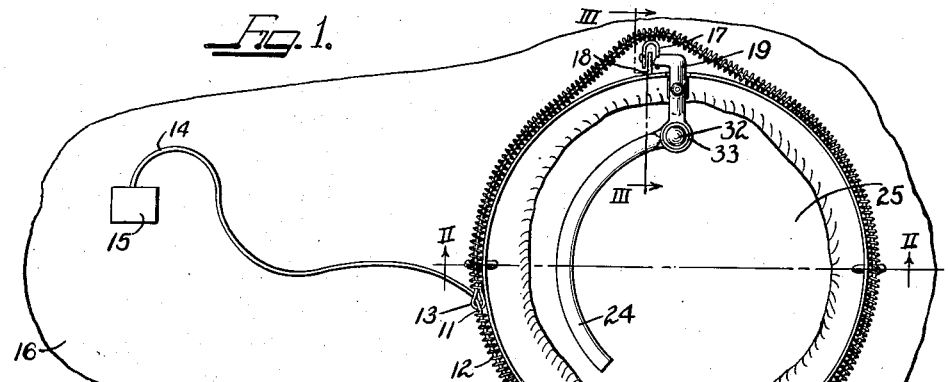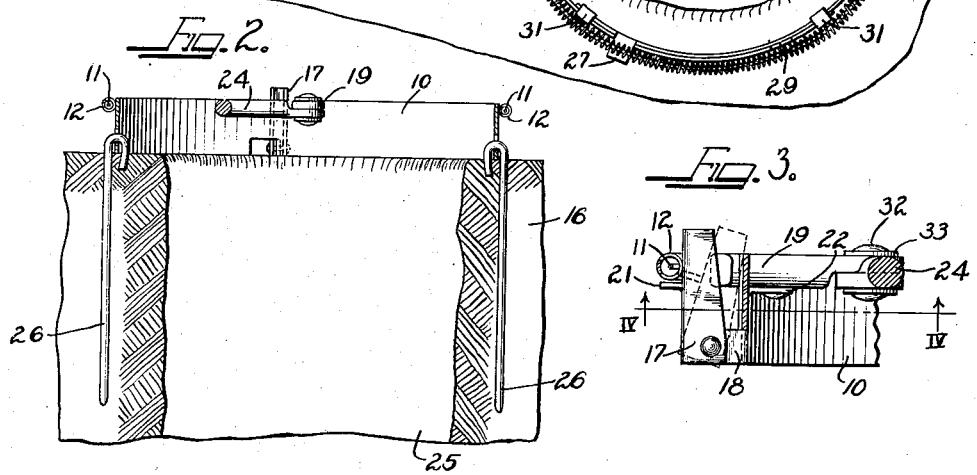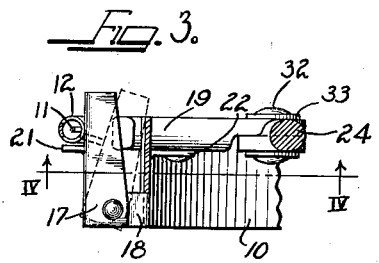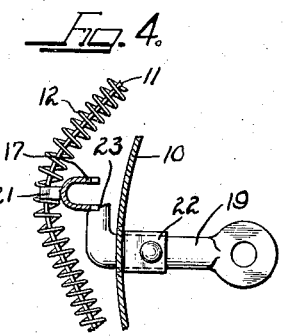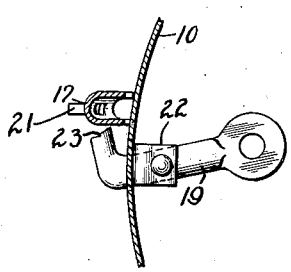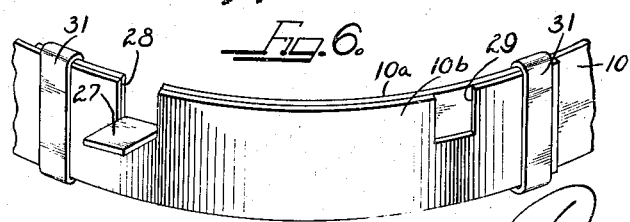

2,247,066

UNITED STATES PATENT OFFICE 2,247,066

TRAP

Antone J. Popp, Chicago, Ill.

Application May 24, 1939, Serial No. 275,347

16 Claims. (Cl. 43—87)

This invention relates to traps for capturing wild animals and particularly to traps for catching the smaller varieties of fur bearing animals alive for breeding purposes, although, of course, the trap may be constructed in any size and be used for catching any size of animals and may be adjusted so as to not catch the animal alive.

One of the principal objects of the present invention is to provide a trap of the character described which is simple and light in weight so that a trapper may carry and set a relatively large number of traps at once.

Another object of the present invention is to provide a trap of the character described which is composed of relatively few and simple parts and therefore has a low manufacturing cost.

A still further object of the present invention is to provide a trap having a noose or snare with means for tightening the snare and positive means for preventing the tightening of the snare beyond a predetermined point.

Other objects and advantages of my invention will appear from the following description and accompanying drawing, in which:

Figure 1 is a plan view of one of the preferred forms of my invention as it appears when set over the mouth of a burrow;

Figure 2 is a cross section on the line II—II of Figure 1, looking in the direction of the arrows;

Figure 3 is a cross section on an enlarged scale on the line III—III of Figure 1, looking in the direction of the arrows;

Figure 4 is a section on the line IV—IV of Figure 3, looking in the direction of the arrows;

Figure 5 is a view similar to Figure 4 but showing the relation of the parts after the trap has been sprung; and Figure 6 is a perspective view of a detail of the trap on an enlarged scale.

The particular form of the invention which is shown in the drawing comprises a ring or frame 10 large enough to allow the animal which it is intended to catch to pass freely through it. The frame 10 serves as a support for a noose 11 and a spring 12 by which the actual catching of the animal is accomplished.

The spring 12 is a helical tension spring having its ends fastened together, so as to form a continuous loop, and the noose 11 extends around inside of the spring 12. The noose 11 is formed of flexible material having a certain amount of stiffness and having a fairly smooth surface. These characteristics are necessary in order that the noose may slide inside of the spring 12 as the spring and the noose contract without any portion of the noose catching between the convolutions of the spring 12. I have found that ordinary types of chain are unsuited as a material for the noose, as the individual links get caught between the coils of the contracting spring 12, and the chain itself contracts in length, due to the slack created at each link, instead of sliding around inside of the spring 12 as the spring contracts. If a type of chain is employed which will not form small loops or tangle with the spring 12, such chain will operate satisfactorily, and my invention includes the use of such a chain for the noose 11. It has been found that when extremely flexible stranded wire is employed as a material for the noose 11, the wire is thrown into small loops which catch between the coils of the spring and prevent the smooth operation of the trap.

The noose 11 is preferably made of wire composed either of a single strong and resilient strand, such as piano wire or the like, or else of a wire composed of a small number of strands so that it will not be too flexible. In any case, the wire forming the noose 11 should have enough stiffness so that, when it is pushed endwise within the spring 12 by the contraction of the spring, it will slide along inside of the spring and not be pushed out between the coils of the spring. Then, when the spring 12 contracts and lessens the circumference of the noose 11, the excess wire will be forced out of the noose through the eye 13 on the end of the wire. The end 14 of the wire at the other end from the noose is adapted to be secured to some suitable fixed object, such as a stake 15 driven into the ground 16.

When the trap is set, the noose 11 and spring 12 not only extend around the outside of the frame 10, but pass over a channel-shaped keeper 17 pivoted to a lug 18 on the side of the frame. The keeper 17 is normally held in a position perpendicular to the plane of the frame 10 by a trigger 19 upon which it rests so that the noose 11 and spring 12 will not tend to slide off of it in either direction. In addition, the web of the keeper 17 is provided with a lug 21 against which the spring 12 may rest and which prevents it from sliding in the wrong direction at any time. The trigger 19 is pivoted upon a lug on the frame 10 and is able to swing in the plane of the frame 10. The end of the trigger 19 is provided with a small shoulder 23 which engages the underside of the keeper 17 and holds it in its position perpendicular to the plane of the frame 10.

When the trigger is swung to the side, the shoulder 23 is disengaged from the keeper 17, which is then left supported only by its pivotal connection to the lug 18 on the frame. When this occurs, the keeper is swung by the pressure of the spring 12 passing across it to the position shown in dotted lines in Figure 3, and the spring 12 slides up off of the keeper 17 and off of the frame 10.

As soon as the spring 12 slides up off of the frame 10, it is no longer held stretched out in a large loop and immediately contracts, at the same time contracting the noose 11 within it, and thus catches any animal which may be within the noose at that time.

In order to insure that the release of the spring 12 and noose 11 occurs when the animal to be caught is passing through the frame 10, the trigger 19 is provided with an extension 24 which extends across at one side of the frame, where it will be pressed to one side by an animal attempting to pass through the frame 10. In order to insure that the animal to be caught passes through the frame 19, the frame is placed over the mouth of a burrow 25 in which the animal makes its home or is otherwise suitably located or baited in order to entice the animal to pass through it. In order that the frame may be securely held in whatever position desired, it is provided with a pair of pins 26 pivoted to its sides. When the trap is set at the mouth of a burrow 25, the pins 26 may be forced down into the ground as shown in Figure 2.

When the trap is set in a runway with the frame 10 upright, the pins 26 may lie in the plane of the frame and be forced down into the ground far enough to hold the frame 10 at the proper height. In this position, swinging of the frame 10 on the pins 26 is prevented by the tight frictional fit of the sides of the frame between the main portions of the pins on the outside of the frame and the bent-back ends of the pins on the inside of the frame. The pins 26 may also be placed at an angle, as circumstances may require, as when the frame is placed in an inclined position adjacent to a root or stone with a piece of bait behind it, or when the trap is set on rocky ground into which the pins 26 cannot be forced.

In order to enable the trap to be adjusted to fit different locations or to be set to catch animals of different sizes, the frame 10 is arranged so that it may be made larger or smaller. Instead of being a solid ring, the ring 10 is formed of a strip of material curved into ring shape and having its two ends 10a and 10b overlapping as shown in Figures 1 and 6. The ends 10a and 10b are held together by clips 31 which can be slid along the ring 10 and over the overlapping portions 10a and 10b as shown in Figure 6. Sliding of the overlapping portions 10a and 10b of the ring is prevented by an outwardly extending lug 27 on the inner overlapping portion 10a which fits into either one of several notches 28, 29 in the outer overlapping portion. By sliding the clips 31 around the ring and off of the overlapping portions 10a and 10b, the overlapping portions can be separated from each other, withdrawing the lug 27 from the notch 28 through which it projects, and the overlapping portions can be put together again with the lug 27 extending through a different notch 29. The clips 31 can then be slid back into position so as to hold the overlapping portions together and hold the ring 10 adjusted to a different size. While only two notches 28 and 29 have been shown in the drawings, giving two positions of adjustment, it is obvious that any desired number of notches may be provided, and a plurality of lugs 27 may also be provided to fit in more than one notch at a time.

Besides serving as part of the arrangement which allows the size of the ring 10 to be adjusted, the lug 27 facilitates the setting of the trap in that it serves as a stop against which the spring 12 is placed as it is being stretched around the frame 10. In setting the trap, the spring may be held at one point against the lug 27 with one hand while the other hand is used to stretch the spring out and lay it progressively in place around the outside of the frame 10. If desired, additional lugs may be placed at other points around the outside of the frame 10 in order to aid in locating the spring 12 in position.

Besides the frame 10 being adjustable in size, the trigger extension 24 which extends across the opening in the frame may also be adjustable, although, of course, the extension 24 may be made integral with the main portion of the trigger 19. To allow for adjusting the trigger extension 24, this extension is secured to the trigger 19 by means of a pivot 32, and suitable means, such as a Belville or other form of spring washer 33, are provided to hold the extension 24 tightly enough so that it can be moved relative to the trigger 19 only by the exertion of an appreciable force and not accidentally. Thus, before the trap is set, the extension 24 on the trigger can be adjusted so that it will be in exactly the right place to be pushed aside by the animal passing through the ring 10. It will of course be understood that the particular adjusting means shown is disclosed merely by way of example and that other adjusting means may be readily devised.

An important feature of my invention to which attention is particularly directed is the fact that the spring 12 not only closes the noose 11 about the animal to be caught but also positively limits how much the noose 11 may be tightened. The spring 12 is an ordinary coil spring formed in the usual manner with considerable initial set so that, when it is allowed to contract, the successive coils of the spring will press tightly against each other. Thus, the loop formed by the spring 12 will contract to its minimum size, and then there will be no clearance between successive turns of the spring. When it reaches that size, it can be contracted no further because the coils of the spring then abut solidly against each other, and the noose 11, which lies within the spring, is prevented from contracting by the spring.

If the trapper is engaged in catching a particular species of animal, he knows from experience what size noose will serve to securely hold the animal without injuring it, and he can select and use with the trap a spring which will contract the noose to that size and prevent it from being contracted further by the effort of the animal to escape. This enables the trapper to catch the animal alive and uninjured, as may be desired if the animal is wanted for breeding purposes or for sale to a zoological garden or the like. However, if the trapper is interested only in catching the animal for the sake of its fur, a smaller spring can be employed, which will hold the animal more securely and lessen the possibility of escape.

While I have described and illustrated only one form of my invention, it will of course be understood that many other forms and variations thereof may be devised by the skilled mechanic, and that my invention includes all constructions which fall within the scope of the accompanying claims.

I claim as my invention:

1. A trap comprising a coil spring loop, an annular frame adapted to hold said loop extended, a noose formed of a flexible member capable of transmitting endwise pressure, the loop of said noose extending around within said coil spring and being coextensive with said coil spring loop, and means operable by the attempted passage of an animal through said open frame for releasing said coextensive loops from said frame.

2. A trap comprising a coil spring loop, an annular frame adapted to hold said loop extended, a noose having the loop thereof extending around within said coil spring, the loop of said noose being coextensive with said coil spring loop, and means operable by the attempted passage of an animal through said frame for releasing said coextensive loops from said frame.

3. A trap comprising a coil spring loop, a rigid frame adapted to hold said loop extended, a noose having the loop thereof extending around within and coextensive with said coil spring, a keeper for holding said coextensive loops in position on said frame, and a trigger for holding said keeper in operative position, said keeper being constructed and arranged so that movement of said trigger from a set position allows said keeper to move under pressure of said spring to a position allowing said loop to become disengaged from said frame.

4. A trap comprising a rigid stationary annular frame, a noose adapted to extend around the outside of said frame, means for exerting a force to contract said noose, a member movable from a position for retaining said noose on the outside of said frame under the influence of said force to a position for causing said noose to become disengaged from said frame under the influence of said force, and means for causing said member to move from said first position to said second position upon the attempted passage of an animal through said open frame.

5. A trap comprising a rigid annular frame, a keeper movably mounted on the frame and having at least a portion thereof on the outside of said frame, a noose adapted to extend around said frame and over said portion of said keeper, means for exerting a force to contract said noose, and a trigger for releasably holding said keeper in a set position with respect to said frame, said keeper being shaped so that said noose will remain on said keeper when said keeper is in said set position and so that said noose will slide off of said keeper and said frame when said keeper is released by said trigger.

6. A trap comprising an open rigid frame having the outer surface thereof on at least one side of said frame perpendicular to the plane of said frame, a keeper pivoted to said frame adjacent the other side thereof and having at least a portion extending outside of said frame, a trigger for holding said keeper in a set position, the outer surface of said portion of said keeper being perpendicular to the plane of said frame when said keeper is in said set position, a noose adapted to extend around said frame and said keeper and to bear against said outer surfaces on said frame and said keeper, and means for exerting a force to contract said noose.

7. In a trap, a frame for holding a noose, said frame comprising a flat strip of resilient material, means for holding the ends of said strip in parallel overlapping relation, and means for preventing relative sliding of said ends.

8. In a trap, a frame for holding a noose, said frame comprising a strip of resilient material, and means for holding the ends of said strip in parallel overlapping relation, one of said ends having an aperture therein and the other of said ends having a projection adapted to extend through said aperture and prevent relative sliding of said ends.

9. In a trap, a frame for holding a noose, said frame comprising a flat strip of resilient material, and means for holding the ends of said strip in parallel overlapping relation, said ends being shaped to fit together in non-sliding relation when placed together and overlapping each other any one of a plurality of different predetermined distances whereby the size of said frame may be adjusted.

10. In a trap, a frame for holding a noose, said frame comprising a strip of resilient material bent around with its ends placed in parallel overlapping relation, means for holding said ends in said overlapping relation, and means including a projection on one of said ends, an aperture on the other of said ends, said means extending through said aperture for preventing relative sliding of said ends, said end having said aperture also having at least one other aperture for receiving said projection whereby said ends may be placed together with different amounts of overlap.

11. In a trap, a frame having a lug extending therefrom, a sheet metal channel member having flanges located on opposite sides of said lug, a pin extending through said flanges and said lug and pivotally connecting said channel member to said frame, a tensioned flexible member extending over and pressing upon said channel member at a point spaced from said pin, and releasable means for supporting said channel member against pivoting under the pressure exerted thereon by said tensioned member.

12. In a trap, a frame for holding a noose comprising a flat strip of resilient material having the ends thereof in parallel overlapping relation, one of said ends having a projection thereon, an aperture in the other of said ends for receiving said projection, and a sleeve slidably embracing both of said ends for holding said ends together and preventing movement therebetween.

13. A trap comprising a contractible member formed as a loop, an annular frame adapted to hold said loop extended, a flexible member in constant coextensive association with said loop and having one end fixed against movement relative to said loop and its other end free for movement relative to said loop, and means operable by the attempted passage of an animal through said frame for releasing said coextensive loop and flexible member from said frame.

14. In a trap having an opening through which an animal may attempt to pass, means stressed into a position adjacent said opening for catching an animal therein, and a trigger mechanism for releasing said means from said position, said trigger mechanism having a latching portion intermediately mounted for pivotal movement with one end thereof being arranged for holding and releasing said means, a separate trigger portion having one end rigidly connected to the other end of said latching portion, and a member for connecting said ends of the trigger mechanism portions in various angular relations.

15. A trap comprising a coil spring loop, an annular frame adapted to hold said loop extended, a flexible member extending through the coils of said loop having one end positioned between adjacent coils and the other end extending to the outside of the coils, and means operable by the attempted passage of an animal through said frame for releasing said loop from said frame.

16. A trap comprising an adjustable annular frame having an opening through which an animal may attempt to pass, a contractible member adapted to extend around the outside of said frame, a rockable keeper member between said frame and said contractible member, means on said keeper member maintaining said contractible member against endwise movement, a trigger device on said frame having a portion engageable with said keeper for rocking the latter to a set position maintaining the contractible member around said frame and having a portion extending into the opening and adapted to be moved by the animal attempting to pass therethrough to release the keeper from its set position and the contractible member from around the frame, and means for angularly adjusting one trigger portion with respect to the other for varying the position of the portion located in the trap opening.

ANTONE J. POPP.